United States Patent [19]
Lin et al.

[11] Patent Number: 5,120,030
[45] Date of Patent: Jun. 9, 1992

[54] MAGNET ASSISTED LIFTGATE STRUT

[75] Inventors: William C. Lin, Troy; Michael G. Reynolds, Sterling Heights; Thomas W. Nehl, Shelby Township, Macomb County, all of Mich.

[73] Assignee: General Motors Corporation, Detroit, Mich.

[21] Appl. No.: 705,988

[22] Filed: May 28, 1991

[51] Int. Cl.⁵ .......................... F16F 5/00; F16F 9/32
[52] U.S. Cl. .................................. 267/120; 188/300; 188/267; 267/64.12
[58] Field of Search .............. 267/120, 64.12, 64.11, 267/124, 182, 170, 166, 178; 188/267, 300, 322.19, 322.11, 321.11; 280/707

[56] References Cited

U.S. PATENT DOCUMENTS

| | | | |
|---|---|---|---|
| 3,059,915 | 10/1962 | Kemelhor | 188/267 X |
| 3,240,295 | 3/1966 | Martinek et al. | 188/267 |
| 3,770,290 | 11/1973 | Bottalico | 188/267 X |
| 3,883,126 | 5/1975 | Nicholls | 267/65 R |
| 3,979,109 | 9/1976 | Ishida | 267/64 R |
| 4,427,188 | 1/1984 | Shimokura et al. | 267/64.12 |
| 4,458,887 | 7/1984 | Shimokura et al. | 267/64.12 |
| 4,527,780 | 7/1985 | Bich | 267/64.12 |
| 4,570,912 | 2/1986 | Dodson et al. | 267/64.15 |
| 4,634,170 | 1/1987 | Lach | 296/76 |
| 4,669,711 | 6/1987 | Beer | 188/267 X |
| 4,679,775 | 7/1987 | Funaki et al. | 188/267 X |
| 4,718,647 | 1/1988 | Ludwig | 267/120 X |
| 4,744,548 | 5/1988 | Hathaway | 267/64.12 |
| 4,779,845 | 10/1988 | Bartesch et al. | 267/120 |
| 4,792,127 | 12/1988 | Kortgen | 267/64.15 |
| 4,807,855 | 2/1989 | Schuitema | 267/64.12 |
| 4,824,082 | 4/1989 | Schaupp | 267/120 |
| 4,865,169 | 9/1989 | Rachels et al. | 188/300 |
| 4,867,317 | 9/1989 | Wildemann et al. | 267/64.12 |
| 4,938,520 | 7/1990 | Shelton | 296/76 |

Primary Examiner—Douglas C. Butler
Attorney, Agent, or Firm—Raymond I. Bruttomesso, Jr.

[57] ABSTRACT

A strut has a cylinder body having one end closed and a piston rod which reciprocates into and out of the cylinder body through the other end thereof defining retracted and extended positions of the strut. A magnet mounted on the piston rod operates with the other end of the cylinder body in the extended position of the strut to create a magnetic force biasing the strut to the extended position. The magnet allows the strut to move from the extended position if a force sufficient to overcome the magnetic force is applied to the strut. A second embodiment has a spring mounted to the interior of the closed end of the cylinder. A first magnet is mounted on the piston rod creating a magnetic repulsive force between the two magnets urging the magnets away from each other. The spring force urging the first magnet towards the second magnet so that the strut is urged toward the extended position.

3 Claims, 2 Drawing Sheets

5,120,030

MAGNET ASSISTED LIFTGATE STRUT

This invention relates to a strut for a liftgate of a motor vehicle and more particularly to a strut with a magnet to assist in retaining the strut in the extended position.

BACKGROUND OF THE INVENTION

Liftgates and hoods are hingedly mounted to vehicles and pivot between an opened and closed position to grant access to a cargo area or an engine compartment respectively. Gas struts are used to assist opening the liftgate or hood and support the same in the open position. Referring to the liftgate, a pair of struts, one on each side of the liftgate, has an end connected to the liftgate and another end connected to the vehicle body. Both struts are identical with each strut having a cylinder-and-piston arrangement with a chamber within the cylinder defined by a first end of the cylinder and the piston, which is filled with a pressurized gas. The pressurized gas end pushes against the piston urging the strut to an extended position in which the liftgate is opened. The strut is held in a retracted position by the liftgate being latched to the vehicle resisting the bias of the pressurized gas. These struts are commonly called pneumatic springs or gas springs.

It is known that the force exerted by the strut is a function of the gas pressure. It is also known that the gas pressure in the cylinder is affected by the temperature, since the pressure increases as the temperature increases if the volume is constant. It is necessary that it be possible to close the liftgate of the vehicle against the bias of the strut. Therefore, the amount of gas placed in the chamber during manufacturing must take into account the highest temperature the strut is likely to encounter, since the pressure of the gas is highest at this highest temperature resulting in highest force exerted. During cold weather, the strut will exert the minimum amount of force which could result in the liftgate not being held in the fully opened position or the force exerted could be too weak to maintain the liftgate opened at all. There has been proposed previously various methods to secure the liftgate in the opened position by mechanically locking the piston relative to the cylinder.

It would be desirable to have a non-mechanical means for securing the strut in the extended position compensating for variation of force of strut caused by temperature.

SUMMARY OF THE INVENTION

This invention provides a strut having a cylinder body having one end closed and a piston rod which reciprocates into and out of the cylinder body through the other end thereof defining a retracted and an extended position of the strut. A magnet mounted on the piston rod operates with the other end of the cylinder body in the extended position of the strut to create a magnetic force biasing the strut to the extended position. The magnet allows the strut to move from the extended position if a force sufficient to overcome the magnet force is applied to the strut.

A second embodiment has a spring mounted to the interior of the closed end of the cylinder. A first magnet is mounted to the other end of the spring. A second magnet is mounted on the piston rod creating a magnetic repulsive force between the two magnets urging the magnets away from each other. The spring force urges the first magnet towards the second magnet therefore urging the strut toward the extended position.

One object, feature and advantage resides in a strut having a magnet mounted on a piston rod which operates with a cylinder body in an extended position of the strut to create a magnetic force biasing the strut to the extended position.

Another object, feature and advantage resides in the provision of a strut having a cylinder body with a spring mounted on the interior at one end of the cylinder body and a piston rod reciprocates into and out of the cylinder body through the other end thereof defining a retracted and an extended position of the strut and a pair of magnets with one mounted on the other end of spring and the other mounted on the piston rod creating a repulsive force between the two magnets urging the magnets away from each other and with the spring force urging the one magnet towards the other magnet so that the strut is urged towards the extended position in which the other magnet cooperates magnetically with the other end of the cylinder body to create a magnetic attraction force biasing the strut to the extended position.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
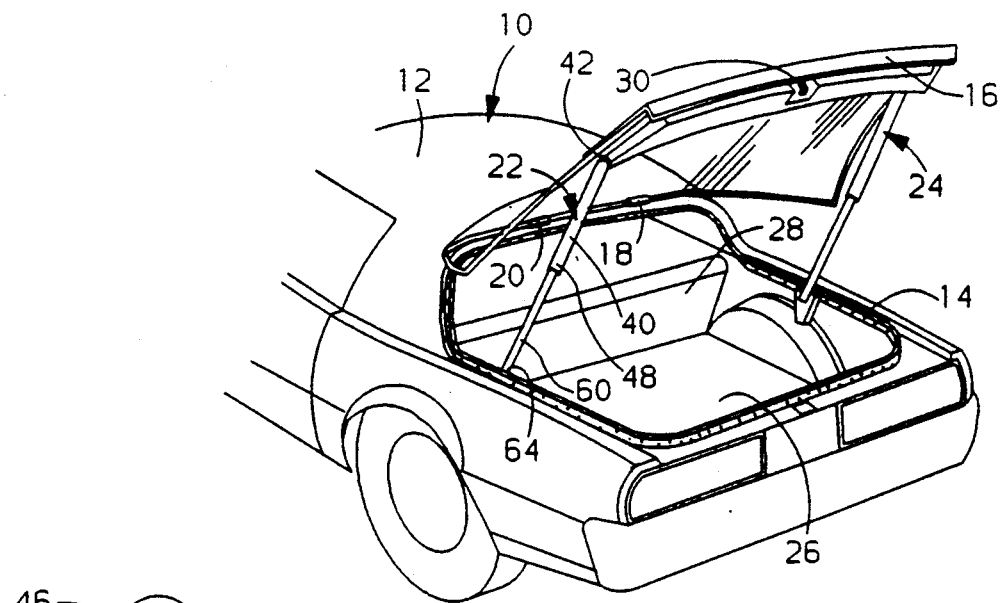
FIG. 1 is a fragmentary perspective view of the rear portion of the vehicle having a liftgate.

FIG. 1 shows a motor vehicle 10 that includes a body 12 defining a rear hatch opening 14. A liftgate 16 is hingedly connected to the body 12 by a pair of hinges 18 and 20 to permit the liftgate 16 to pivotably move between an open position, as shown in FIG. 1, and a closed position covering the rear hatch opening 14. The liftgate 16 provides access to a storage area 26 behind a rear seat 28 of the vehicle 10.

Figure 2:
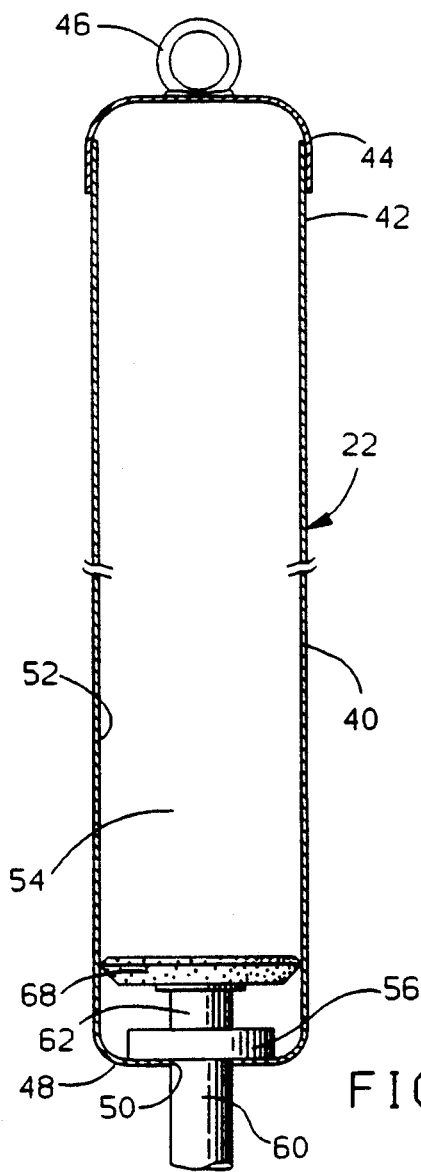
FIG. 2 is a cross sectional view of the cylinder and piston of the strut.

Referring to FIG. 1, a pair of struts 22 and 24 are provided, one on each side of the liftgate 16. The strut 22 has a tubular cylinder body 40, made of steel or other suitable ferro magnetic material, that has a first end 42 that is closed by a cap 44 and is pivotably connected to the liftgate 16. Extending from the cylinder 40 is a piston rod 60, having a far end 64 that is pivotably connected to the body 12. The other strut 24 is identical. Referring to FIG. 2, a mounting member 46 is secured to the cap 44 of the cylinder 40 for pivotally mounting to the liftgate 16 via a pivot means. A mounting member, not shown in detail, is secured to the far end 64 of the piston rod 60 for pivotally mounting to the body 12 via a pivot means.

A piston 68 made of a semi-rigid plastic or other suitable material is mounted to a near end 62 of the piston rod 60 and slidably engages an inner surface 52 of the cylinder 40. A chamber 54 defined by the closed first end 42 of the cylinder and the piston 68 is filled with a pressurized gas at manufacturing. The pressurized gas within the cylinder 40 has sufficient pressure to place the strut 22 in an extended position maintaining the liftgate 16 in the open position as shown in FIG. 1. In order to close the liftgate 16, the operator must pull downward on the liftgate 16 to overcome the force exerted by the pressurized gas and move the strut 22 to a retracted position and to secure the liftgate 16 to the body 12 in the closed position by use of a latch 30. With the liftgate 16 in the closed position, the strut 22 is held in the retracted position.

Figure 3:
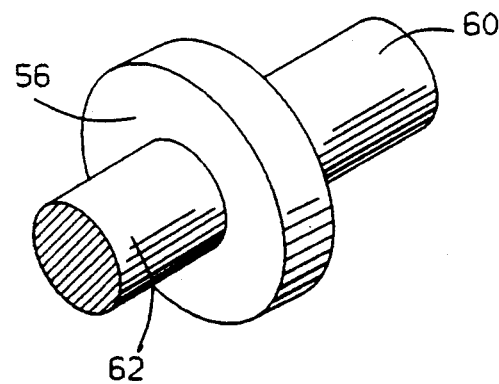
FIG. 3 is a fragmentary perspective view of the magnet and the piston.

Referring to FIG. 2, the first end 42 of the cylinder 40 of the strut 22 is closed by the cap 44 or other suitable means. The cylinder 40 has a second end 48 with an opening 50 through which the piston rod 60 extends. The piston rod 60 slides in and out of the cylinder 40 defining the retracted and extended positions of the strut 22. Referring to FIGS. 2 and 3, a doughnut shaped permanent magnet 56 is glued or otherwise suitably mounted to the piston rod 60 near the piston 68.

When the latch 30 is unlatched, the strut 22 is free to move. The pressurized gas pushes against the piston 68 urging the strut 22 towards the extended position. The force exerted by the pressurized gas decreases as the strut moves from the retracted position to the extended position since the piston 68 moves increasing the volume in the chamber 54, which is occupied by the pressurized gas. As the liftgate 16 approaches the open position, the permanent magnet 56 nears the second end 48 of the cylinder 40 and the magnetic attraction force between the magnet 56 and the second end 48 of the cylinder 40 biases the strut 22 toward the extended position. The force between the magnet 56 and the cylinder 40 is proportional to the inverse of the square of the distance between the magnet 56 and the second end 48 of the cylinder 40. When the strut 22 reaches the extended position, the magnet 56 engages the second end 48 of the cylinder 40 and the magnetic force urging the strut 22 towards this extended position is at its greatest.

To close the liftgate 16, the operator pulls the liftgate down against the force of the pressurized gas in the chamber 54 and the force of the magnet. Initially the force of the magnet is at its greatest, but decreases as the magnet 56 moves away from the open end 48 of the cylinder 40. However, the force of the pressurized gas increases as the strut 22 moves towards the retracted position since the volume in the chamber 54 decreases. The strength of the magnet 56 and the design of the strut 22 must take into account the temperature variations the strut 22 will be used in and the minimum force required to open the liftgate 16 and the maximum force the operator can exert to close the liftgate 16.

Figure 4:
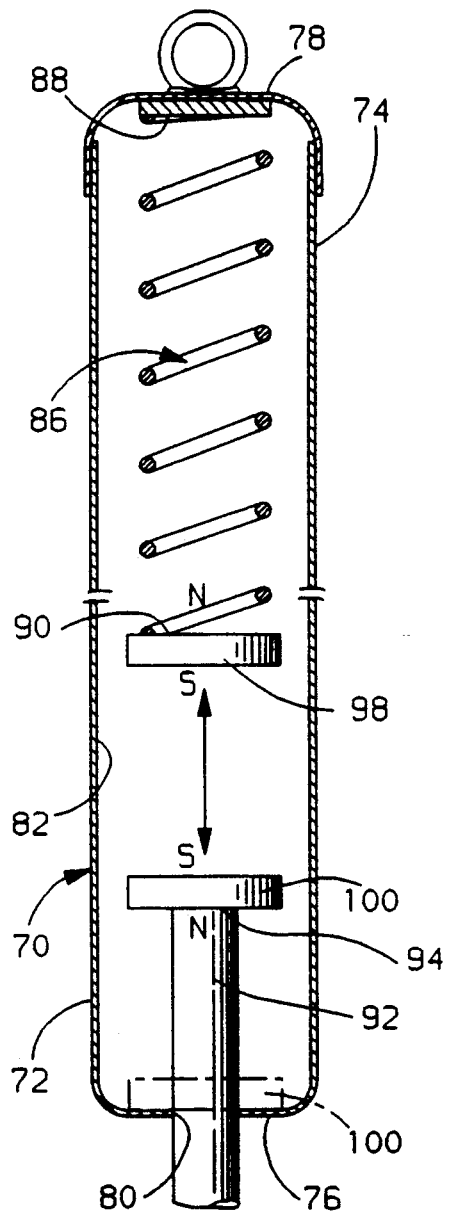
FIG. 4 is a cross sectional view of the second embodiment of the strut. The strut is shown in phantom in the extended position.
Figure 5:
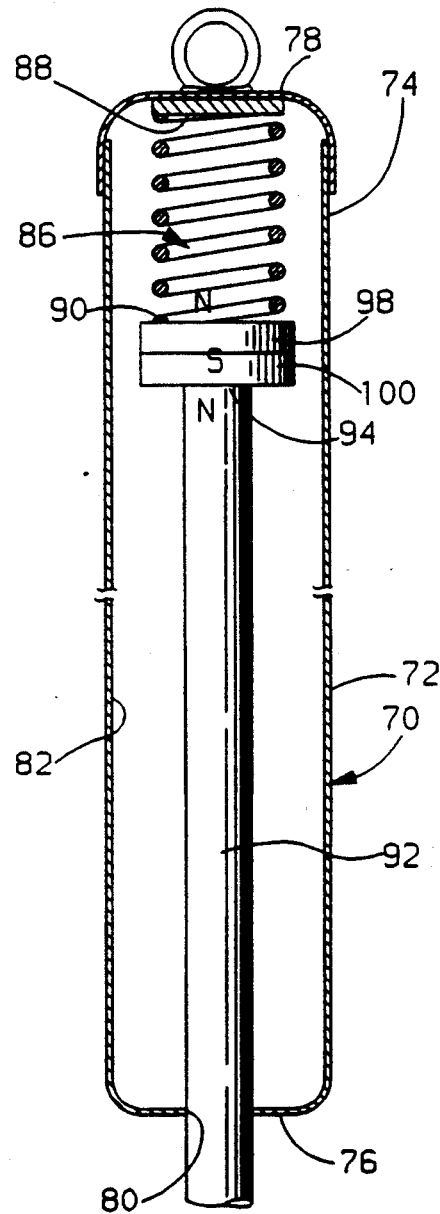
FIG. 5 is a cross sectional view of the second embodiment of the strut in the retracted position.

A second embodiment of the invention, shown in FIG. 4, has a cylinder 72 of a strut 70, made of steel or other suitable ferro magnetic material, with a first end 74 closed by a cap 78 or other suitable means. A cylindrical helical compression spring 86 has a first end 88 mounted to an interior 82 of the cylinder 72 on the cap 78. A first permanent magnet 98 is mounted to a second end 90 of the spring 86.

The cylinder 72 has a second end 76 with an opening 80 through which a piston rod 92 extends. The piston rod 92 slides in and out of the cylinder 72 defining the retracted and extended positions of the strut 70. A second magnet 100 is mounted to a near end 94 of the piston rod 92 and a magnetic repulsive force is created between the two magnets 98 and 100 since the like charged poles face each other. The mounting members are similar to the first embodiment.

When the latch 30 is unlatched, the strut 70 is free to move. The spring 86 biased to a lengthened position, which is compressed when the strut 70 is retracted, will now urge the first magnet 98 towards the second end 76 of the cylinder 72. This causes the second magnet 100, which has the magnetic repulsive force relative to the first magnet 98, to move the second magnet 100 and the piston rod 92 toward the second end 76 of the cylinder 72. As the piston rod 92 and the second magnet 100 move, the spring 86 continues to expand to the lengthened position thereby continuing to urge the piston rod and the second magnet 100 towards the second end 76 of the cylinder 72. As the liftgate 16 approaches the opened position, the second magnet 100 nears the second end 76 of the cylinder 72 and the magnetic attraction force between the second magnet 100 and the second end 76 of the cylinder 72 biases the strut 70 toward the extended position. When the strut 70 reaches the extended position, the second magnet 100 engages the second end 76 of the cylinder 72 and the magnetic force between the second magnet 100 and the cylinder 72 biasing the strut 70 towards this extended position is at its greatest.

To close the liftgate 16, the operator pulls the liftgate down against the force of the magnet 100. Initially the force of the second magnet 100 in relation to the second end 76 of the cylinder 72 is at its greatest, but decreases as the second magnet 100 moves away from the second end 76 of the cylinder 72. However, the repulsive force of the two magnets 98 and 100 increases as the second magnet 100 approaches the first magnet 98 as the strut 70 is moved toward the retracted position. The force of the spring 86 is only involved in the last portion of retracting the strut 70, when the repulsive force of the two magnets 98 and 100 is strong enough to compress the spring 86 and when the magnets 98 and 100 are in contact with each other and motion of the piston rod 92 is directly translated into compression of the spring 86. The latch 30 secures the liftgate 16 in the closed position thereby retaining the strut 70 in the retracted position. The strength of the magnets 98 and 100, along with the design of the strut 70 including the spring 86, must take into account the minimum force required to open the liftgate 16 and the maximum force the operator can exert to close the liftgate 16.

FIG. 1 shows a pair of struts, this does not imply that two struts are required. The number of struts required is a function of the design and use.

While two embodiments of the present invention have been explained, various modifications within the spirit and scope of the following claims will be readily apparent to those skilled in the art.

The embodiments of the invention in which an exclusive property or privilege is claimed are defined as follows:

1. In a strut having a cylinder body of ferro magnetic material having one end closed, a piston rod reciprocating into and out of the cylinder body through an other end thereof defining retracted and extended positions of the strut, the improvement comprising:

magnet means cooperating with the other end of the cylinder body in the extended position of the strut to create a magnetic attraction force biasing the strut to the extended position and the magnet means allowing the strut to move from the extended position towards the retracted position if a force sufficient to overcome the magnetic force is applied to the strut.

2. A gas strut comprising:

a cylinder body of ferro magnetic material having one end closed and an other end;

a piston rod reciprocating into and out of the cylinder body through the other end thereof defining retracted and extended positions of the strut and having a piston located within the cylinder body;

a gas under pressure in the cylinder body operating at all times against the piston of the rod to create a force to urge the strut towards the extended position; and magnet means mounted on the piston rod and cooperating with the other end of the cylinder body in the extended position of the strut to create a magnetic attraction force biasing the strut to the extended position and the magnetic means enabling the gas strut to move from the extended position when a sufficient force is applied to overcome the force of the gas and the magnetic means to the gas strut.

3. A strut comprising:

a cylinder body having one end closed and another end;

a piston rod reciprocating into and out of the cylinder body through the other end thereof defining retracted and extended positions of the strut;

a spring with one end mounted to the closed end of the cylinder adapted to create a spring force; and a pair of magnets with one magnet mounted on the other end of the spring and the other magnet mounted on the piston rod creating a magnetic repulsive force between the two magnets urging the magnets away from each other and the spring force urging the one magnet towards the other magnet so that the strut is urged towards the extended position and the other magnet operative with the other end of the cylinder body in the extended position of the strut to create a magnetic attraction force biasing the strut to the extended position and the magnetic means enabling the strut to move from the extended position if a sufficient force is applied to the strut to overcome the magnetic forces and the spring force.

* * * * *